Figure 1:
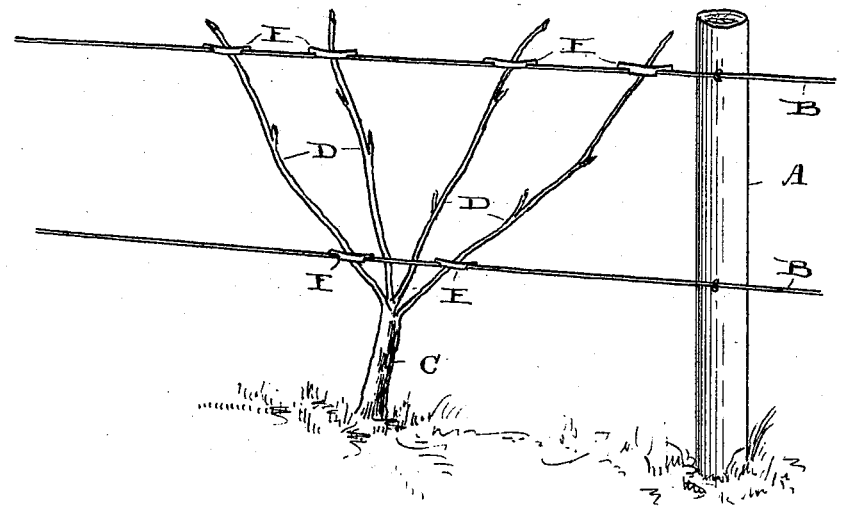

(No Model.)

T. J. FORDE.
MEANS FOR FASTENING VINES TO TRELLISES.

No. 587,365. Patented Aug. 3, 1897.

ATTEST
R. B. Moser
H. E. Medrow

INVENTOR
Thomas J. Forde
By H. J. Fisher  Atty

THE NORRIS PETERS CO., PHOTO-LITHO., WASHINGTON, D. C.

UNITED STATES PATENT OFFICE.

THOMAS J. FORDE, OF GENEVA, OHIO.

MEANS FOR FASTENING VINES TO TRELLISES.

SPECIFICATION forming part of Letters Patent No. 587,365, dated August 3, 1897.

Application filed February 15, 1897. Serial No. 623,379. (No model.)

*To all whom it may concern:*

Be it known that I, THOMAS J. FORDE, a citizen of the United States, residing at Geneva, in the county of Ashtabula and State of Ohio, have invented certain new and useful Improvements in Means for Fastening Vines to Trellises; and I do hereby declare that the following is a full, clear, and exact description of the invention, which will enable others skilled in the art to which it appertains to make and use the same.

My invention relates to means for fastening vines to a trellis; but the invention is more especially designed to fasten grape-vines to wire trellises.

It is well known to those familiar with the cultivation of grapes that the vines have to be cut back annually to a few short vines, usually three or four, from which the ensuing season's growth and fruit are produced. When this trimming has taken place, the next thing is to firmly secure the trimmed vines on the trellis. The trellis most commonly employed in all larger and well-conducted vineyards consists of suitable posts at intervals and a series of two or more strands of wire fixed thereto at different elevations. It is to these wires that the grape-vines are secured, and hitherto the common method of securing them has been by tying them with heavy cord or twine; but a number of objections may be mentioned to the tying method, among which is the expense, because at best it is a very slow and tedious work and often makes the hands so sore that very little progress can be made. Then, again, there is the objection of imperfect tying, resulting in the sliding of the vines on the wire in case of storm, and frequently in their breaking loose from their fastenings and thus endangering the fruit. These and other objections to the use of twine for fastening the vines are common and well known. To avoid or overcome these objections, various expedients have been tried, but, so far as I know, wholly without success, so that apart from my invention the universal practice is to use twine, as before. One of these expedients was a wire fastening bent into shape and adapted to engage on the wire strands or trellis over the vines; but these were found objectionable because they would slip under pressure of wind, and if made small enough to spring into position would fatally cut the branch. If not small enough to spring, they were too stiff for advantageous use, and so they had to be discarded. I have therefore devised a medium for fastening the vines in which all the foregoing objections and others not enumerated have been taken into account and by which they are one and all overcome and remedied.

Figure 2:
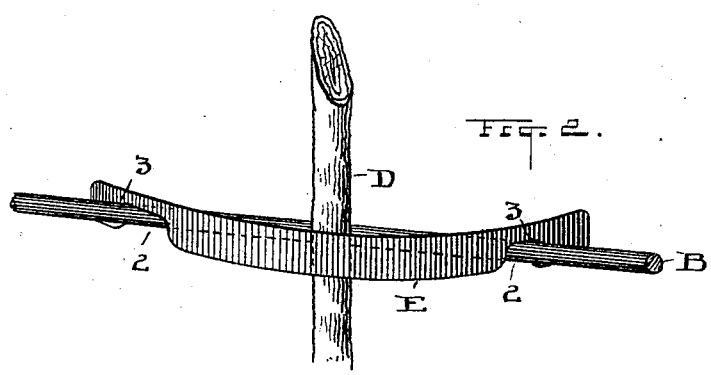
Figure 3:

Referring to the accompanying drawings, Figure 1 is an elevation of a section of a common form of grape-trellis as found in our large vineyards and showing a grape-vine which has been trimmed or pruned and its short branches fastened by my improved fasteners. Fig. 2 is an enlarged portion of Fig. 1, showing a single stem and trellis-wire and fastener. Fig. 3 is a side elevation of my new and improved fastener.

The trellis, as here shown, consists of the posts A and the strands of wire B.

C is the stock or butt of the vine, and D are the several vines remaining after the usual spring pruning. These vines have to be fastened at one or more places to the trellis to hold them in separated or spread position relatively about as shown, so that all the vines will have an equal chance for light and air when they put forth their branches and fruit.

E represents my novel vine-fastener. This fastener is formed of a piece of thin flat spring metal or other equivalent material and has recesses 2 in one of its edges, having each an outer curved depression or portion 3 of a size to fit comfortably on the wire B. These recesses 2 are oblong, so as to give them room to engage very small vines, and the half-eye portion 3 is of the nature of a hook to engage over and hold the fastener securely on the wire. Normally the fastener E is straight and when removed from its engagements will resume its original shape, so that it can be used over and over again year after year.

It will be noticed that the fastener is flat, so that it cannot injure the vine, and has spring and length enough to adapt it equally well to large or small vines; but possibly no greater advantage exists in this form of fastener than the fact that by reason of its exceeding thinness and spring the hook portions 3 form a sharp bite on the wire and render it impossible to slide the fastener thereon even when attempted by hand. Hence wherever a vine is fastened it is fastened for the season and nothing can move the fastener or detach it from place.

It will be obvious, also, that even an unskilled person could soon become skilled in securing vines with this fastener and do very rapid work, and since it is intrinsically cheap as an article of manufacture and sale and can be used for a series of years and retain its efficiency its economy and desirability will be evident.

Any shape that is adapted to engage on the wire B and hold the fastener therein may be given to the hook portion 3 of the recess 2. A peculiarity and advantage of this fastener is that in case of wind the fastener will turn more or less on the wire, and thus give some play to the vines and keep them from breaking off.

What I claim as new, and desire to secure by Letters Patent, is—

A device for securing grape-vines and the like to wire trellises, consisting of a strip of straight flat spring metal having open recesses in its lower edge near its ends, said recesses constructed alike and having a hook in their outer portion to engage over the wires, whereby a reversible spring fastening device is produced, substantially as described.

Witness my hand to the foregoing specification this 8th day of February, 1897.

THOMAS J. FORDE.

Witnesses:
F. D. WILSON,
SAMUEL W. PECK.